Figure 1:
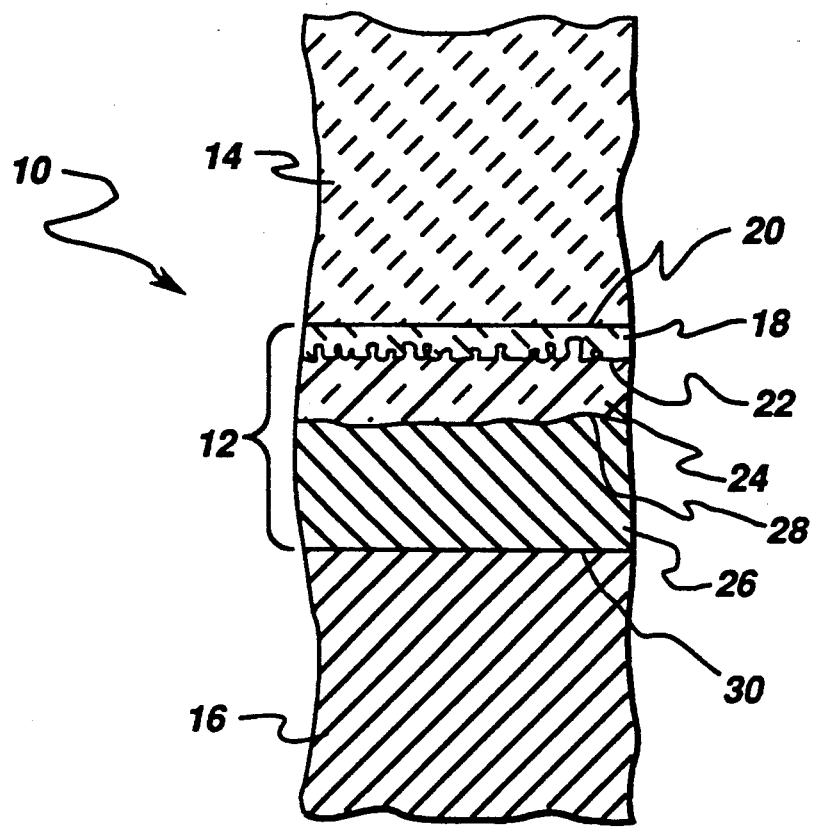

United States Patent [19]
Nied et al.

[11] Patent Number: 5,290,333
[45] Date of Patent: Mar. 1, 1994

[54] METAL-CERAMIC STRUCTURE WITH INTERMEDIATE HIGH TEMPERATURE REACTION BARRIER LAYER

[75] Inventors: Herman F. Nied, Clifton Park; Richard L. Mehan, Scotia, both of N.Y.

[73] Assignee: General Electric Company, Schenectady, N.Y.

[21] Appl. No.: 984,613

[22] Filed: Dec. 2, 1992

Related U.S. Application Data

[62] Division of Ser. No. 353,580, May 18, 1989, Pat. No. 5,200,241.

[51] Int. Cl.$^5$ .............................................. C03C 27/00
[52] U.S. Cl. ............................................ 65/31; 65/36; 65/43; 65/59.1; 65/59.7; 156/662
[58] Field of Search ................... 65/31, 36, 43, 59.1, 65/45, 59.7; 156/662

[56] References Cited

U.S. PATENT DOCUMENTS

| | | | |
|---|---|---|---|
| 3,833,348 | 9/1974 | Stokes et al. | 65/43 |
| 3,881,904 | 5/1975 | Stokes et al. | 65/43 |
| 4,109,050 | 8/1978 | Mehan et al. | 428/332 |
| 4,705,585 | 11/1987 | Kelly et al. | 65/36 |
| 4,952,454 | 8/1990 | Iwamoto et al. | 428/446 |

OTHER PUBLICATIONS

V. A. Greenhut, "Joining of Ceramic-Metal Systems: General Survey", vol. 4, 1986, Encyclopedia of Materials Science and Engineering, pp. 2463-2467.
J. T. Klomp, "Joining of Ceramic-Metal Systems: Procedures and Microstructures", Encyclopedia of Materials Science and Engineering, vol. 4, 1986, pp. 2467-2475.

*Primary Examiner*—W. Gary Jones
*Assistant Examiner*—Steven P. Griffin
*Attorney, Agent, or Firm*—Patrick R. Scanlon; Paul R. Webb, II

[57] ABSTRACT

A Si—SiC ceramic layer is bonded to a non-porous SiC substrate with the Si etched from the layer to form a relatively porous surface on the otherwise non-porous high strength SiC substrate. A quartz layer is softened by heating and forced into the pores of the porous layer to form a mechanical bond to the SiC substrate. A refractory metal layer is bonded to the quartz layer to complete the joint. A refractory metal support component is then bonded to the refractory layer whereby the quartz serves as a high strength, high temperature reaction barrier between the metal of the refractory layer and the silicon of the SiC substrate.

8 Claims, 1 Drawing Sheet

METAL-CERAMIC STRUCTURE WITH INTERMEDIATE HIGH TEMPERATURE REACTION BARRIER LAYER

This application is a division of application Ser. No. 07/353,580 filed May 18, 1989, now U.S. Pat. No. 5,200,241.

This invention relates to structures for joining metal to ceramic substrates.

The joining of a metal structure to a ceramic substrate is of present widespread interest. Ceramic materials provide chemical inertness to corrosive or oxidative environments, strengthening and stiffness at ambient and elevated temperatures, and other properties not exhibited by other materials. The metal provides complimentary high strength properties so the ceramic-metal system produces technological advantages not otherwise possible with the ceramic or metal alone.

One particular problem involves a high temperature-high stress environment. In certain heat exchanger applications, the tubes of the heat exchanger are required to withstand high temperatures, e.g., in the range of 750°–1000° C. and high internal pressures, e.g., 1500 psi. It is recognized that ceramic materials are better than metals for this purpose. High temperature fluids flowing through the tubes of a heat exchanger tend to cause excessive oxidation if the tubes were metal. Even high temperature refractory metals heavily oxidize at temperatures in the temperature range mentioned. Therefore, ceramic tubes are more desirable.

However, a problem arises using ceramic tubes. Not all ceramics are capable of withstanding temperatures in the range of 750°–1000° C. The present inventors recognize that silicon based ceramics can withstand such temperatures. One solution, therefore, is to secure silicon based ceramic tubes to refractory metal support structures. But, the effects of exposure of metal-ceramic direct joints for relatively long periods at temperatures in excess of 700° C. in an oxidizing environment is known to seriously effect the quality of any such bond. Even in the presence of an inert external atmosphere, at temperatures above 700° C., it is known that severe metal-ceramic reactions take place between silicon based structural ceramics, such as silicon carbide and silicon nitride, and most metals. These reactions produce silicides which seriously weaken the bonded joint. Silicides are relatively brittle and therefore tend to fail under the stresses induced by the high pressures of the system.

The joining of metals to ceramic, however, is the subject of long-term ongoing studies toward the solution of combining these materials for particular applications. The joining of ceramic-metal systems, for example, is discussed in the *Encyclopedia of Materials Science and Engineering*, Vol. 4, 1986, pgs. 2463–2467, in an article entitled "Joining of Ceramic-Metal Systems: General Survey" by V. A. Greenhut and in an article entitled "Joining of Ceramic-Metal Systems: Procedures and Microstructures" by J. T. Klomp at pages 2467–2475. While these articles address generally the problems of joining metal or glass to ceramic substrates, they do not deal with the high temperature, high stress environment problem to which the present invention is directed, and particularly, how to join a metal to a ceramic capable of withstanding high temperatures in the range of 750°–1000° C. Still other discussions of ceramic/metal joints for structural applications are in an article entitled "Ceramic/Metal Joining for Structural Applications" by Nicholas et al. *Material Science and Technology*, September 1985, Vol. 1, pgs. 657–665. This article also does not address the high temperature-high stress problem faced by the present inventors.

In the encyclopedia article by Greenhut, for example, the bonding mechanisms discussed at page 2464 discuss the bonding of metal to ceramic or glass to ceramic. The article discusses mechanical bonding where a liquid metal or glass can penetrate pores or cavities in the solid to provide further mechanical bond because of the interlocking nature of the structure. Ceramic chemical bonding is also discussed wherein metal to ceramic chemical bonding is difficult. Glass can be joined to an oxide coating of metal. However, the glass referred to, in any case, is a low temperature type normally not capable of withstanding the high temperature environment in a heat exchanger of the type discussed above. The metal-silicide problem is not discussed at all.

At page 2465, the article states that certain refractory metals are suitable for use in ceramic joints, but only where their oxidation resistance does not create a problem. Obviously, temperatures of 750°–1000° C. create such a problem. Generally, the article discusses several metal-ceramic bonding methods in paragraph 5 at pages 2465 et seq. These processes are used to produce a metal coating suitable for metal brazing methods. This is stated to be the most common method for producing a ceramic-metal joint. A brazed joint, however, can not withstand the 750°–1000° C. range. Various other metallizing techniques are discussed but all are implicit in creating a metallic coating suitable for subsequent brazing. For example, at page 2466, the article discusses using ceramic glazes and glass frits with a low softening temperature to join ceramics to each other and to metals. The article is silent however, in what to do in high temperature environments. The article by Klomp suffers from similar drawbacks.

In the article by Nicholas et al., at page 664, a discussion of most joints is made in which the joints are fabricated using intermediate bonding agents. However, these intermediate bonding agents employ applications of low temperature glass frits and brazing techniques which are in widespread use. Glass frits are a material which has a softening temperature below 600° C. and therefore is not capable of withstanding the relatively high temperatures of 1000° C. Thus, the problem to which the present invention is directed involves high temperature, high pressure applications employing a structural ceramic, such as silicon carbide or silicon nitride, and bonding a metal to that ceramic such that the bond does not deteriorate due to differences in coefficients of thermal expansion (CTE) or chemical reactions which normally occur at the ceramic-metal interface. The present inventors recognize a need for a metal-ceramic structure which is capable of withstanding relatively high temperatures and high pressures without subsequent mechanical or chemical reaction failures of the joint.

A structure in accordance with the present invention comprises forming a silicon based ceramic substrate and securing a layer of glass to the substrate wherein the glass has a softening temperature of at least about 750° C. The glass serves as a barrier to chemical reaction between a metal member secured thereto and the silicon in the substrate. A refractory metal member is bonded to the layer of glass.

In one embodiment the metal member is a refractory material and the glass is quartz, for example, fused silica. This structure can withstand the stresses produced by relatively high pressure differentials, for example, pressure differentials of over 1500 psi and relatively high temperatures of 750° C. and greater without chemical or mechanical failure of the joint.

IN THE DRAWING

Figure 2:
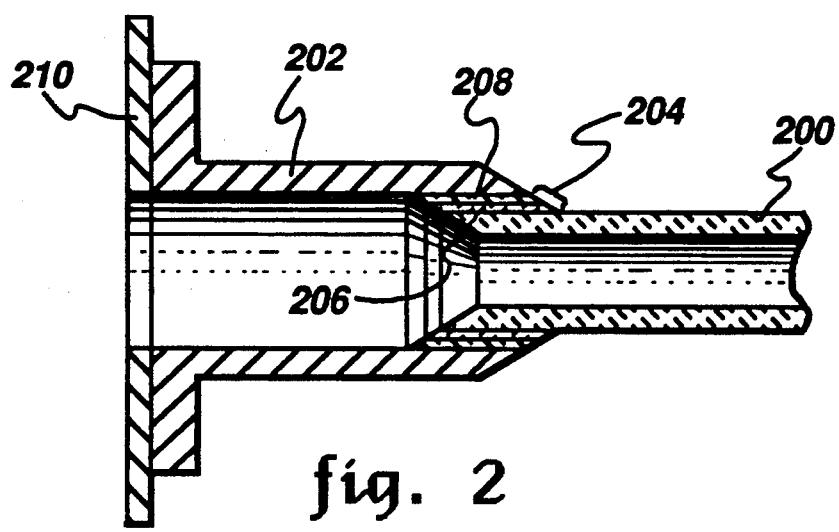

FIG. 1 is a sectional view of a high temperature metal-ceramic structure in accordance with one embodiment of the present invention; and FIG. 2 is a sectional elevation view of the metal-ceramic structure according to the embodiment of FIG. 1 in which a ceramic tube is secured to a support.

In FIG. 1, a portion of a structural ceramic component 10 is shown which can withstand temperature cycling, for example, between 0° C.–1000° C. without thermal shock failure or without thermal stress failure of the joint 12. The joint 12 joins a ceramic substrate 14 to a metal element 16. At elevated temperatures, for example, at or above about 750° C. and, preferably at 800° C., the joint 12 precludes reaction of the metal element 16 to the material of the substrate 14 and withstands tensile stresses induced by pressure differentials of about 1500 psi and atmospheric pressure. The substrate 14 is a silicon-based ceramic which may be, for example, silicon carbide or silicon nitride. These materials are capable of withstanding elevated temperatures at or above 750° C. without deleterious effects. For example, alumina based ceramics tend to soften at temperatures at or above 800° C. such that the modulus of elasticity decreases significantly. The ceramic substrate 14 preferably is one of relatively low porosity for high strength application. A silicon carbide material, for example, exhibits a tensile stress of about 20,000 psi. Silicon carbide material, for example, may be fabricated by sintering a powder with hot isostatic pressing to remove the porosity required to produce a high strength material. The low porosity of the substrate 14 thus precludes the mechanical bonding of a metal element, such as element 16, directly to the substrate as discussed in the encyclopedia article mentioned in the introductory portion. The mechanical bonding referred to in these articles indicates that liquid metal or glass can be attached to a roughened surface by causing the fluid to penetrate pores or cavities in the solid to provide a mechanical bond via the interlocking nature of the structure.

Further, the composition of the substrate 14 is limited by the need to have the substrate retain its characteristics at temperatures above 750° C. For example, the Nicholas et al. article mentioned in the introductory portion, at page 658, discusses the bonding of glasses and metals to ceramics by fusion bonding. As discussed therein, the range of materials which fusion bonding is useful is limited. As further discussed therein, there should be ideally a close match of melting points and thermal contraction characteristics of not only the metal and the ceramic, but also the complex material formed in the well pool. The article states that this similarity is rarely achievable in practice and that some ceramics such as BN, SiC, Si3N4, sublime or decompose before melting while others such as MgO vaporize rapidly when molten. Further, on cooling, disruptive phase transformations may occur in certain ceramics.

Different properties of certain ceramics and metals are disclosed in Table 1 in the Nicholas et al. article.

While the various ceramics disclosed in Table 1 have relatively high melting points, a problem remains with the sublimation or decomposition of certain of the ceramics at temperatures significantly lower than their melting points. For this reason, substrate 14, FIG. 1, to prevent sublimation and decomposition at temperatures at or above about 750° C. of silicon based substrates which tend to withstand structural stresses and also are capable of withstanding temperatures at or above about 750° C. without sublimation. As mentioned in the introductory portion, a problem with the silicon based substrate however is the potential capability of forming silicides when a metal element, such as element 16, is directly bonded to such a substrate. For this reason joint 12 is provided structure which serves as a reaction barrier to the reaction of the metal of element 16 to the silicon of substrate 14 to prevent the formation of silicides and thus the weakening of the joint forming the bond between the two materials.

Joint 12 comprises a Si—SiC substrate layer 18 which is bonded to surface 20 of the silicon based substrate 14. The Si—SiC layer 18 can be bonded to the substrate 14 using known technology to provide a high strength joint due to the fact that the layer 18 and the substrate 14 are substantially similar materials, i.e., SiC.

The purpose of bonding layer 18 which may be, for example, a millimeter or less in thickness, to the substrate 14 is to provide a porous surface to the relatively non-porous substrate 14. To create a porous surface, the silicon in the Si—SiC layer 18 is etched away leaving a porous substrate in the regions of the layer formerly occupied by the Si material. The etching of a silicon-based ceramic material is disclosed in more detail in U.S. Pat. No. 4,109,050 assigned to the assignee of the present invention and incorporated by reference herein. As discussed in the patent, etching solutions can be used which include, for example, mixtures of hydrochloric and nitric acid. The silicon-based ceramic is treated with the etching to effect the removal of at least 0.001 (0.025 mm) inch to 0.010 (0.25 mm) inches of the silicon from the silicon-based ceramic layer 18. After the etching has been rinsed from the surface of the silicon-based ceramic, the resultant layer 18 is a roughened material whose pores are significantly larger than the pores of the substrate 14 which is not etched. The etching has no effect on the silicon in the substrate 14 and only removes the excess silicon portion of the Si—SiC layer 18. This produces a roughened porous surface 22 on the composite structure formed by substrate 14 and layer 18.

A layer of fused silica 24, more commonly referred to as quartz or vitreous silica, is heated to its softening temperature, for example, about 1670° C. Layer 24 is amorphous rather than crystalline. Being amorphous, the layer 24 tends to gradually soften as the temperature increases rather than have a localized melting point as occurs with a crystalline structure. The fused silica has the properties shown in Table 1.

TABLE 1

| | |
|---|---|
| $T_{softening} =$ | 1670° C. (can be made to flow) |
| $T_{set} =$ | 1310° C. (solid behavior below this temperature) |
| $T_g =$ | 1150° C. (no time dependent behavior below this temperature) |
| $\alpha =$ | $5.5 \times 10^{-7}$/°C. |

The softened heated fused silica layer 24 is then compressed against the roughened surface 22 of the etched layer 18. The softened fused silica flows into the interstices of the pores of the etched layer 18 and forms an interlocking bond therein somewhat similar to the procedure described in the aforementioned encyclopedia article by Greenhut. The layer 24 may have a thickness in the range of about 1-2 mm. The depth of the pores into surface 22, may be on the order of about 0.001 to 0.010 inches (0.025 mm to 0.25 mm).

The composite structure comprising the substrate 14, layer 18, and layer 24 comprises a layer of fused silica 24 mechanically secured to the substrate 14 via the layer 18. A metal layer 26 of refractory metal selected from the group consisting of molybdenum, tungsten, titanium and tantalium is bonded to the surface 28 of the layer 24. To bond the refractory layer 26 to the layer 24 requires oxidation of the interface surface of the metal layer 26 so that there is good wetting between the fused silica and metal surfaces. This procedure is discussed in more detail in the aforementioned Encyclopedia and Nicholas articles, which are incorporated by reference herein. As stated in the Encyclopedia article at page 2463, in glass-metal joining, it is common to pre-oxidize the metal. The resulting oxide layer is compatible with fluid glass, may lower the solid-liquid interfacial energy and thereby promote wetting.

The resulting joint 12 is relatively impervious to wide temperature fluctuations, for example 0° to 1000° C., and can withstand sudden wide fluctuations in temperature within that range without fracture or otherwise weakening the connection of the metal layer 26 to the substrate 14. One of the requirements of the joint 12 is that it withstand not only repetitive thermal cycling but thermal shock at which the temperature shifts radically and rapidly in the desired range. The element 16, which may be a refractory metal, may comprise other metals as well. Element 16 is fusion or otherwise bonded to the layer 26 at interface 30. Metal-to-metal bonding such as at interface 30 is known and need not be discussed further herein.

While a fused silica layer 24 is illustrated herein, by way of example, other inorganic glasses may be used to form a suitable barrier layer as long as they meet the requirement of not reacting at high temperatures with the ceramic substrate 14 or form undesirable silicides with the substrate 14. Infiltration of the glass layer 24 into the pores of layer 18 may be accelerated by producing a temperature gradient in the substrate 14-layer 18 composite structure to further assist the flowing of the layer 24 more deeply into the interstices of the pores of layer 18. After the layer 24 is cooled, the infiltrated fused silica in the ceramic pores forms an effective mechanical grip which is not degraded by adverse chemical reaction. The fused silica layer 24 after flowing into layer 18 is a graded layer due to the non-homogeneous ceramic-fused silica mixture in the porous region. Thus the mechanical properties in the layer 18 will be an average of the fused silica properties and the ceramic properties of the substrate 14. Thus, a gradation in material properties exist in proportion to the fused silica—ceramic ratio which will vary from pure ceramic at the ceramic interface at surface 20 to pure fused silica at the fused silica-metal interface at surface 28.

Assuming the layer 26 is a molybdenum alloy, the CTE of such alloys match quite closely with the layer 24 to minimize stress failure due to thermal shock and differences in CTE in the different materials. Table II below gives the various CTE's for different materials.

TABLE II

| MATERIAL | CTE ($\alpha$) |
|---|---|
| Fused Silica | $5.5 \times 10^{-7}$/°C. |
| Borosilicate | $40 \times 10^{-7}$/°C. |
| Soda Lime Silicate | $95 \times 10^{-7}$/°C. |
| SiC | $40 \times 10^{-7}$/°C. |
| Molybdenum | $56 \times 10^{-7}$/°C. |
| Tantalum | $65 \times 10^{-7}$/°C. |
| Tungsten | $45 \times 10^{-7}$/°C. |
| Titanium | $94 \times 10^{-7}$/°C. |

As seen from Table II, there is a variation in a range of $5.5 \times 10^{-7}$/°C. for fused silica and $94 \times 10^{-7}$/°C. for titanium. This is to be compared to a variation of about $50 \times 10^{-7}$/°C. between the fused silica and molybdenum and about $35 \times 10^{-7}$/°C. between fused silica and SiC. It is believed that the range of about $50 \times 10^{-7}$/°C. is the maximum acceptable range of $\alpha$ between the different layers. With regard to titanium, an intermediate material, such as molybdenum, would be used between the titanium and the fused silica. Also if the layer of titanium is made sufficiently thin, it could be made to yield in response to thermal expansion differences. Due to the extreme temperature variations to which the present structure may be exposed, for example, in the range 0° C.–1000° C., closely matching the CTE's of the different materials is important in order to preclude stress failure of the different layers at their interfaces due to different thermal expansions and contractions at the different temperatures.

The fused silica in certain embodiments, may be bonded to a metal with a relatively high coefficient of thermal expansion such as the titanium where in this case, the titanium would surround the glass in such a way that the glass is subjected to compression at room temperature. That is, when the temperatures are increased, the greater expansion of the titanium is utilized to release the compression forces on the inner glass layer so that negligible tension is present at the glass-titanium interface. In other words, at the elevated temperature, there is negligible stresses exhibited between the titanium and glass layer so that when the titanium cools it tends to shrink more than the glass, placing the glass in compression. The stress state in glass-metal bonds, as is known, can be dramatically altered by taking advantage of the viscoelastic nature of the glass. For example, various annealing techniques are available for readjusting or relieving adverse stress distributions in a joint such as joint 12. The viscoelastic behavior may also be used to enhance the high temperature reactions of the joint 12 since the glass layer at elevated temperatures might, due to softening, serve as a somewhat damping or cushioning structure relative to shock and vibrations. Also, the porous layer 18 may also serve as a cushion or shock absorber structure.

In FIG. 2, an embodiment of the structure of FIG. 1 is illustrated in which a ceramic tube 200 is secured to a refractory metal fitting 202 in a high temperature, high pressure heat exchanger. The tube 200 comprises materials similar to the materials of substrate 14, FIG. 1. Fitting 202 may be a refractory metal or other metal element in accordance with a given implementation. When the environment of the structure of FIG. 2 is subjected to temperature variations of about 1000° C., the fitting 202 preferably is a refractory metal. Above 1000° C., even refractory metals heavily oxidize and become unsuitable. The joint 204 comprises a structure similar to the joint 12, FIG. 1, in which a porous high temperature-structural ceramic layer 206 is bonded to the ceramic tube 200 and a glass layer 208 such as fused silica is secured to the ceramic porous layer 206. The fitting 202 may be directly bonded to the glass layer 208 or may be bonded to the layer 208 via an intermediate relatively thin refractory metal layer such as layer 26, FIG. 1, not shown in FIG. 2. The fitting 202 may then be secured by welding, bonding or other mechanical means to a support structure 210.

The tube 200 is useful in a heat exchanger in which fluid such as a gas, at relatively high temperatures, for example 1000° C., and high pressures, for example 1500 psi, flow. These elevated pressures tend to create tensile stresses in the joint 204. These tensile stresses tend to cause a shearing action between the fitting 202 and the tube 200. The combination of materials 204 as discussed in connection with the joint 12 of FIG. 1, resists such shearing action and provides a high temperature, high stress structural joint not previously available in prior art structures.

It should be understood that the term member and element as employed in the claims refers to either a structural element such as fitting 202 or to a relatively thin layer such layer 26, in FIGS. 2 and 1, respectively.

What is claimed is:

1. A method of making a ceramic-metal structure comprising the steps of:
    etching a surface of a silicon based ceramic substrate to effect removal of surface silicon therefrom, thereby producing a porous surface;
    bonding a layer of glass to said porous surface; and
    bonding a refractory metal member to said layer of glass.

2. The method of claim 1 wherein said step of bonding a layer of glass to said porous surface includes heating glass to its softening temperature and then compressing the softened glass against said porous surface.

3. The method of claim 1 wherein said layer of glass comprises a glass having a softening temperature of at least about 750° C.

4. The method of claim 1 wherein said layer of glass comprises fused silica.

5. A method of making a ceramic-metal structure comprising the steps of:
    bonding a layer of a silicon-silicon based ceramic composite to a silicon based ceramic substrate;
    etching a surface of said layer of a silicon-silicon based ceramic composite to effect removal of surface silicon therefrom, thereby producing a porous surface;
    bonding a layer of glass to said porous surface;
    bonding a layer of refractory metal to said layer of glass; and
    bonding a metal member to said layer of refractory metal.

6. The method of claim 5 wherein said step of bonding a layer of glass to said porous surface includes heating glass to its softening temperature and then compressing the softened glass against said porous surface.

7. The method of claim 5 wherein said layer of glass comprises a glass having a softening temperature of at least about 750° C.

8. The method of claim 5 wherein said layer of glass comprises fused silica.

* * * * *